(No Model.)
C. BRIGG.
TUBE WASHER FOR SPINNING MACHINES, &c.
No. 361,859. Patented Apr. 26, 1887.
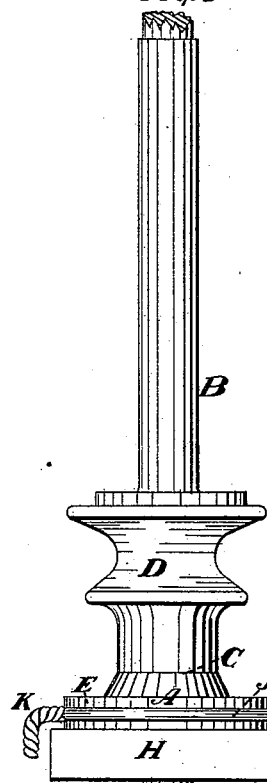
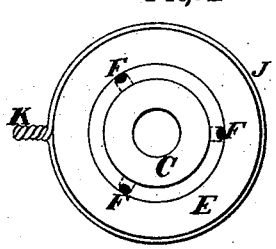
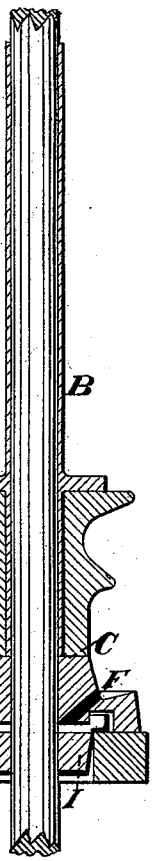
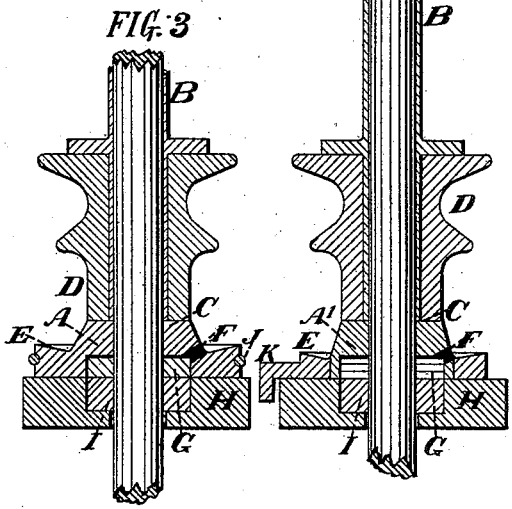
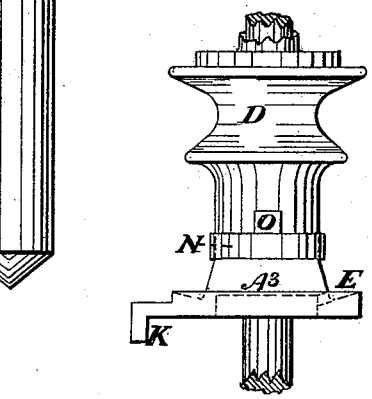
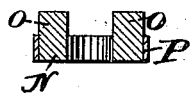
WITNESSES
W. E. Boulter
W. R. Davis
INVENTOR
Charles Brigg
per Henry Orth
his attorney
N. PETERS, Photo-Lithographer, Washington, D. C.

UNITED STATES PATENT OFFICE.

CHARLES BRIGG, OF BRADFORD, COUNTY OF YORK, ENGLAND.

TUBE-WASHER FOR SPINNING-MACHINES, &c.

SPECIFICATION forming part of Letters Patent No. 361,859, dated April 26, 1887.

Application filed October 20, 1886. Serial No. 216,750. (No model.) Patented in England January 7, 1884, No. 893.

*To all whom it may concern:*

Be it known that I, CHARLES BRIGG, a subject of the Queen of England, residing at Bradford, in the county of York, England, have invented new and useful Improvements in Tube-Washers for Spinning-Machines, &c., of which the following is a specification.

The object of this invention is to prevent the dust and short fibers which settle on the upper face of the washers carrying the tubes of spinning, doubling, and twisting frames from working up between the spindles and such tubes, and also to economize the lubricant used to lubricate such tubes. I attain these objects by using washers of special form, as illustrated in the accompanying drawings.

Figure 1 represents an elevation of a spindle-tube and washer, together with the end of the lifter-plate. Fig. 2 is a plan of the washer. Fig. 3 is a vertical section of the washer-tube and lifter-plate, in which a portion of the spindle is shown in elevation. Figs. 4 and 5 are similar views representing modified forms of the washer. Fig. 6 is an elevation showing the application of an additional washer, and Figs. 7 and 8 are views of details hereinafter referred to.

The washer A is provided with a seat, C, projecting therefrom to constitute a bearing-face, upon which the tube B and whirl D revolve, the diameter of which bearing-face is approximately that of the lower end of the whirl. The dust and short fibers which settle upon the annular portion or rim E of the washer are therefore prevented from passing under the bottom of the whirl into the tube. To facilitate lubricating the tube, the said annular portion E of the washer is made concave to receive the lubricant, from which it passes by means of an inclined radial duct or ducts, F, into a cylindrical recess formed in the under side of the washer, that contains a wad or ring of felt, G, which absorbs the lubricant and distributes it upon the spindle as the lifter-plate H is raised and lowered. A second wad, I, is also preferably used, which is placed in a recess in the lifter-plate.

The washer A (represented in Figs. 1 and 2) is made of box or other hard wood. In order to keep such washers from splitting they are strengthened by a wire hoop, J, passed around a semicircular groove cut in the edge of the washer, and the ends of the wire twisted and bent down at right angles to form the hook K, which engages with the back of the lifter-plate H and prevents the washer revolving.

The washer A' (represented in Fig. 4) is a combination of wood and metal. The central or raised face C is wood fitted in an annular portion, E, of metal, provided with a hook, K, to keep the washer stationary.

In the modification shown in Fig. 5 the wad inside the washer and the hook K are dispensed with. A metallic cup, L, (separately represented by Fig. 8,) combining a wad, I, is fitted into a hole in the lifter-plate H, and an annular recess formed in the under side of the washer $A^2$ receives the rim M, formed on the cup L, which rim catches any of the lubricant thrown off by centrifugal force from the under side of the washer and returns it to the cup.

$A^3$, Fig. 6, represents a washer formed entirely of metal, in which case, to protect the bottom of the tube, I introduce a wooden washer, N, hooped with metal, P, between the washer $A^3$ and the bottom of the tube. The washer N is provided with two lugs or tongues, O, which engage with corresponding recesses in the bottom of the tube and cause such washers to revolve therewith. Fig. 7 is a section of the washer N.

I claim—

1. The combination, with the lifter-plate, the spindle, and the tube, of a washer constructed with a raised seat for the tube, a recess or cavity formed in its upper face around said seat for containing a lubricant, and a duct for conveying the lubricant from the recess in which it is contained to the spindle, substantially as and for the purpose specified.

2. The combination, with the lifter-plate, the spindle, and the tube, of a washer constructed with a raised seat for the tube, a recess or cavity formed in its upper face around said seat for containing a lubricant, a duct for conveying the lubricant from the recess in which it is contained to the spindle, and a locking device connected with the washer and engaging the lifter-plate to lock the washer thereto and hold it against rotation on the plate, substantially as and for the purpose specified.

3. The combination, with the lifter-plate, the spindle, and the tube, of a washer upon which the tube is seated, provided with a lubricant-receptacle in its upper face, a lubricant-pad arranged in a recess in the under side of the washer, and a feed-duct for feeding the lubricant to the pad, substantially as and for the purpose specified.

4. The combination, with the wooden washer, of a metallic hoop or band encircling said washer, constructed with a hook, as described.

5. The combination, with the lifter-plate, the spindle, and the tube, of a washer upon which the tube is seated provided with a lubricant-receptacle in its upper face, a cup containing a lubricant-pad inclosing the spindle and projecting within a recess in the under side of the washer, and a feed-duct for feeding the lubricant to the pad, substantially as described.

In testimony whereof I have hereto set my hand in the presence of the two subscribing witnesses.

CHARLES BRIGG.

Witnesses:
DAVID NEWELL,
S. A. DRACUP.